（12）United States Patent
Xiao et al.

(10) Patent No.: US 8,169,223 B2
(45) Date of Patent: May 1, 2012

(54) IONIZATION VACUUM GAUGE

(75) Inventors: Lin Xiao, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/387,242

(22) Filed: Apr. 30, 2009

(65) Prior Publication Data

US 2009/0278436 A1 Nov. 12, 2009

(30) Foreign Application Priority Data

May 7, 2008 (CN) .......................... 2008 1 0066962

(51) Int. Cl.
*G01L 21/30* (2006.01)
(52) U.S. Cl. ........... 324/460; 324/464; 324/459; 73/755
(58) Field of Classification Search .................. 324/460; 73/755

See application file for complete search history.

(56) References Cited

U.S. PATENT DOCUMENTS

| 5,422,573 | A | * | 6/1995 | Bills et al. ..................... 324/460 |
| 6,046,456 | A | * | 4/2000 | Bills .............................. 250/397 |
| 6,515,482 | B2 | * | 2/2003 | Kawasaki ...................... 324/460 |
| 6,566,884 | B2 | * | 5/2003 | Rutherford et al. ........... 324/460 |
| 7,040,948 | B2 | * | 5/2006 | Mao et al. ........................ 445/25 |
| 7,049,823 | B2 | * | 5/2006 | Correale ......................... 324/460 |
| 7,169,437 | B1 | * | 1/2007 | Shiffler et al. ................... 427/77 |
| 7,768,267 | B2 | * | 8/2010 | Knott et al. ..................... 324/460 |
| 7,791,350 | B2 | * | 9/2010 | Xiao et al. ...................... 324/460 |
| 7,906,971 | B2 | * | 3/2011 | Boardwine et al. ........... 324/460 |
| 2007/0145878 | A1 | * | 6/2007 | Liu et al. ........................ 313/336 |
| 2007/0190422 | A1 | * | 8/2007 | Morris ........................ 429/231.4 |
| 2008/0100301 | A1 | * | 5/2008 | Knott ............................. 324/460 |
| 2008/0299460 | A1 | * | 12/2008 | Feng et al. .................. 429/231.8 |
| 2009/0072836 | A1 | * | 3/2009 | Choi et al. ..................... 324/460 |
| 2009/0075171 | A1 | * | 3/2009 | Feng et al. ..................... 429/209 |

* cited by examiner

*Primary Examiner* — Huy Q Phan
*Assistant Examiner* — Richard Isla Rodas
(74) *Attorney, Agent, or Firm* — Altis Law Group, Inc.

(57) ABSTRACT

An ionization vacuum gauge includes a cathode, an anode and an ion collector. The anode is surrounding the cathode. The ion collector is surrounding the anode. The cathode, the anode and the ion collector are concentrically aligned and arranged in that order. The anode comprises a carbon nanotube structure including a plurality of carbon nanotubes.

12 Claims, 8 Drawing Sheets ns

IONIZATION VACUUM GAUGE

BACKGROUND

1. Technical Field

The invention relates to vacuum gauges and, particularly, to an ionization vacuum gauge employed with carbon nanotubes.

2. Description of Related Art

Ionization vacuum gauges have been used for several years. The conventional ionization vacuum gauge includes a cathode, an anode surrounding the cathode, and an ion collector surrounding the anode. The cathode, the anode and the ion collector are separated from one another so as to not to be in direct electrical contact with each other. In operation, electrons emitted from the cathode travel towards and through the anode and eventually are collected by the ion collector. In their travels, electrons may collide with the molecules and atoms of gas in the vacuum system. Thus, ions may be produced, and collected by the ion collector. As is well known, the pressure of the vacuum system can be calculated by the formula $P=(1/k)(I_{ion}/I_{electron})$, wherein k is a constant with the unit of 1/torr and is a parameter of a particular gauge geometry and electrical parameters, $I_{ion}$ is a current of the ion collector, and $I_{electron}$ is a current of the anode.

In the process described above, some electrons may collide with the anode when the electrons travel though the anode and cause the anode to emit X rays. A virtual current $I_x$ may be produced when the X ray irradiates the ion collector. The virtual current $I_x$ will produce a virtual pressure $P_x$ which will affect the sensitivity of the ionization vacuum gauge. As is well known, the value of $P_x$ can be calculated by the formula $P_x=(1/k)(I_x/I_{electron})$. And, the pressure of the vacuum system measured by ionization vacuum gauges is $P_m$, and $P_m=P+P_x$. As such, the greater the value of $I_x$ is, the less sensitive the ionization vacuum gauges have. As is well known, the value of $I_x$ is related to the atomic number of the anode material, and the greater the atomic number of the anode material, the greater the value of $I_x$. However, the anode material of the conventional ionization vacuum gauge is metal, which has a relatively high atomic number so as that the virtual current $I_x$ may have a greater value. Therefore, the conventional ionization vacuum gauge tends to be unsuitable for high vacuum systems that are sensitive to temperature and/or light and/or that have extremely high vacuum levels.

What is needed, therefore, is an ionization vacuum gauge that has a small value of virtual current and is suitable for being used in the high vacuum systems.

BRIEF DESCRIPTION OF THE DRAWINGS

Many aspects of the present ionization vacuum gauge can be better understood with reference to the following drawings. The components in the drawings are not necessarily to scale, the emphasis instead being placed upon clearly illustrating the principles of the present ionization vacuum gauge.

FIG. 1 is a schematic, side cross-sectional view showing an ionization vacuum gauge employed with a carbon nanotube wire structure according to a first embodiment.

FIG. 2 is a schematic, top-view cross-sectional view of the ionization vacuum gauge of FIG. 1.

FIG. 3 is a Scanning Electron Microscope (SEM) image of an untwisted carbon nanotube wire.

FIG. 4 is a Scanning Electron Microscope (SEM) image of a twisted carbon nanotube wire.

FIG. 5 is a schematic, side cross-sectional view showing an ionization vacuum gauge employed with a carbon nanotube film according to a second embodiment.

FIG. 6 is a Scanning Electron Microscope (SEM) image of a carbon nanotube film of FIG. 1, which includes a plurality of carbon nanotube segments.

FIG. 7 is a schematic view of the carbon nanotube segment of FIG. 8.

FIG. 8 is a schematic, side cross-sectional view that shows an ionization vacuum gauge according to the third embodiment.

Corresponding reference characters indicate corresponding parts throughout the several views. The exemplifications set out herein illustrate at least one preferred embodiment of the ionization vacuum gauge.

DETAILED DESCRIPTION

Reference will now be made to the drawings to describe in detail embodiments of the present ionization vacuum gauge.

Referring to FIG. 1 and FIG. 2, an ionization vacuum gauge 100 according to a first embodiment is shown. The ionization vacuum gauge 100 includes a linear cathode 102, an anode 104, and a hollow ion collector 106 containing the linear cathode 102 and the anode 104 therein. The linear cathode 102 extends through the center of the anode 104 and is coaxial with the anode 104 and the ion collector 106. The linear cathode 102, the anode 104, and the ion collector 106 are spaced from one another and are not in direct electrical contact with each other.

The ionization vacuum gauge 100 further includes a housing 120 and three leads 122. The housing 120 may be part of a vacuum system in which the linear cathode 102, the helix anode 104, and the ion collector 106 are contained. The housing 120 is connected to a chamber (not shown) whose pressure is to be determined. The three leads 122 are electrically connected to the linear cathode 102, the helix anode 104, and the ion collector 106, respectively. It is to be understood that the vacuum system can incorporate one or more known evacuation mechanisms (not shown), as needed to achieve the desired level of vacuum.

The linear cathode 102 may be a hot cathode or a cold electrode. In the present embodiment, the linear cathode 102 is a cold electrode. The linear cathode 102 includes a linear core 108 and a field emission film 110 coated on the linear core 108. The linear core 108 is an electric conductive element, such as oxidation-resistant metal thread made, e.g., of nickel (Ni), tungsten (W), or copper (Cu). A diameter of the linear core 108 is in a range from about 0.2 mm to about 2 mm. In this embodiment, the diameter is about 0.3 mm. The field emission film 110 mainly consists of carbons, metal, or silicon dioxide. In the present embodiment, the field emission film 110 is composed of carbon nanotubes, low-melting-point glass powders, conductive particles, and an organic carrier/binder. The weight percents of the foregoing ingredients are respectively: about 5%~15% of carbon nanotubes, about 10%~20% of conductive particles, about 5% of low-melting-point glass powders, and about 60%~80% of an organic carrier/binder. The organic carrier/binder will be evaporated and/or burned off in a drying step. The other three ingredients will be left in the final film composition. Carbon nanotubes can be obtained by a conventional method such as chemical vapor deposition, arc discharging, or laser ablation. In this embodiment, the carbon nanotubes are obtained by chemical vapor deposition. The carbon nanotubes have a length of from about 5 microns (μm) to about 15 μm.

A radial space exist between the linear cathode 102 and the ion collector 106 (referred to as D) is in a range from about 10 mm to about 15 mm. The ion collector 106 is made of an oxidation-resistant, conducting metal, such as aluminum (Al), copper (Cu), tungsten (W), or an alloy thereof. The ion collector 106 has an porous and/or planar structure, such as a metallic ring, a metal-enclosed aperture, a metallic net, or a metallic sheet.

A radial space "d" between the anode 104 and the linear cathode 102 is in a range from about 1 millimeter (mm) to about 8 mm. The anode 104 can be a hollow structure including a carbon nanotube wire structure.

The carbon nanotube wire structure includes carbon nanotube wires and carbon nanotube cables. The anode 104 is a helix structure. The carbon nanotube wire structure surrounds the linear cathode 102 as a helix that has the pitch of about 100 μm to about 1 cm.

Figure 1:
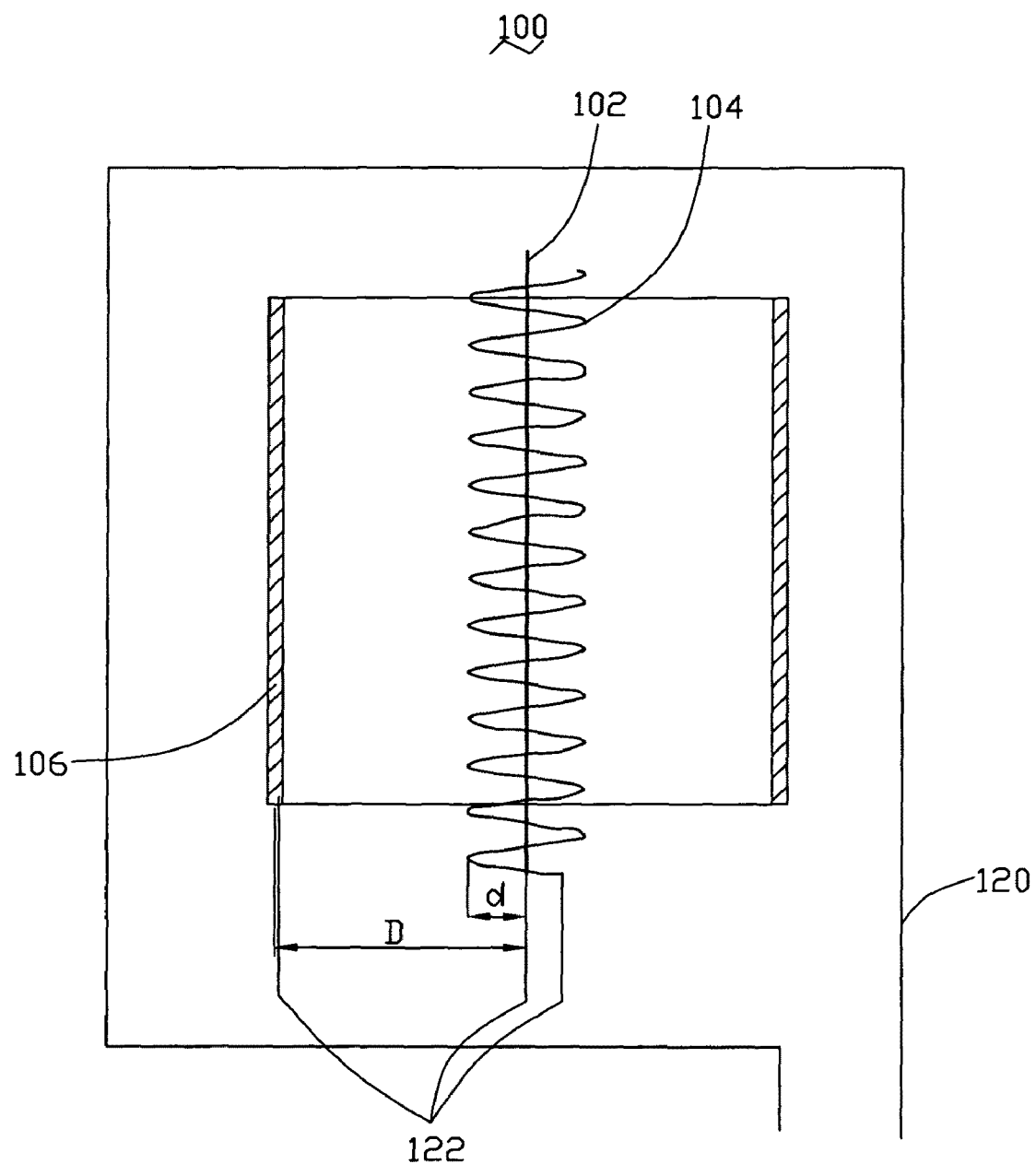
Figure 2:
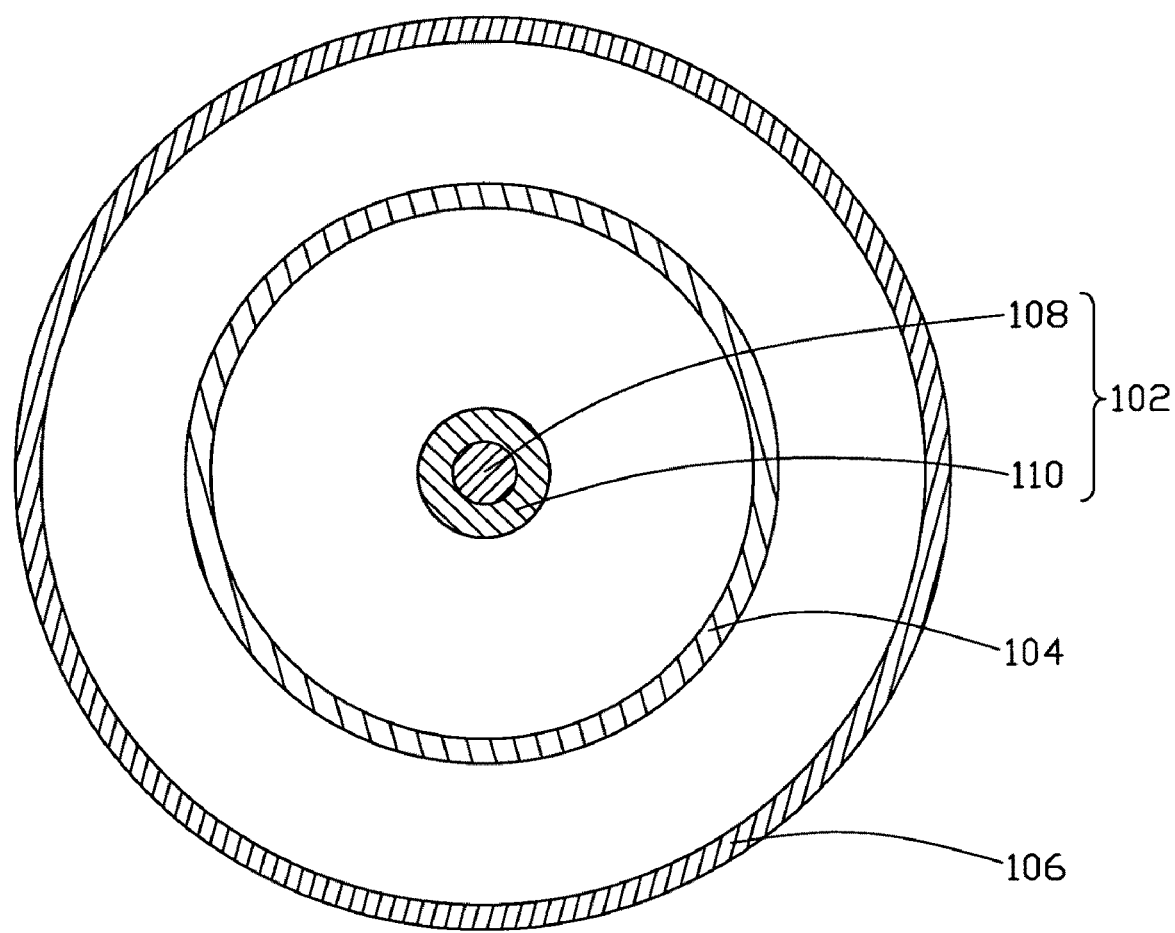
Figure 3:
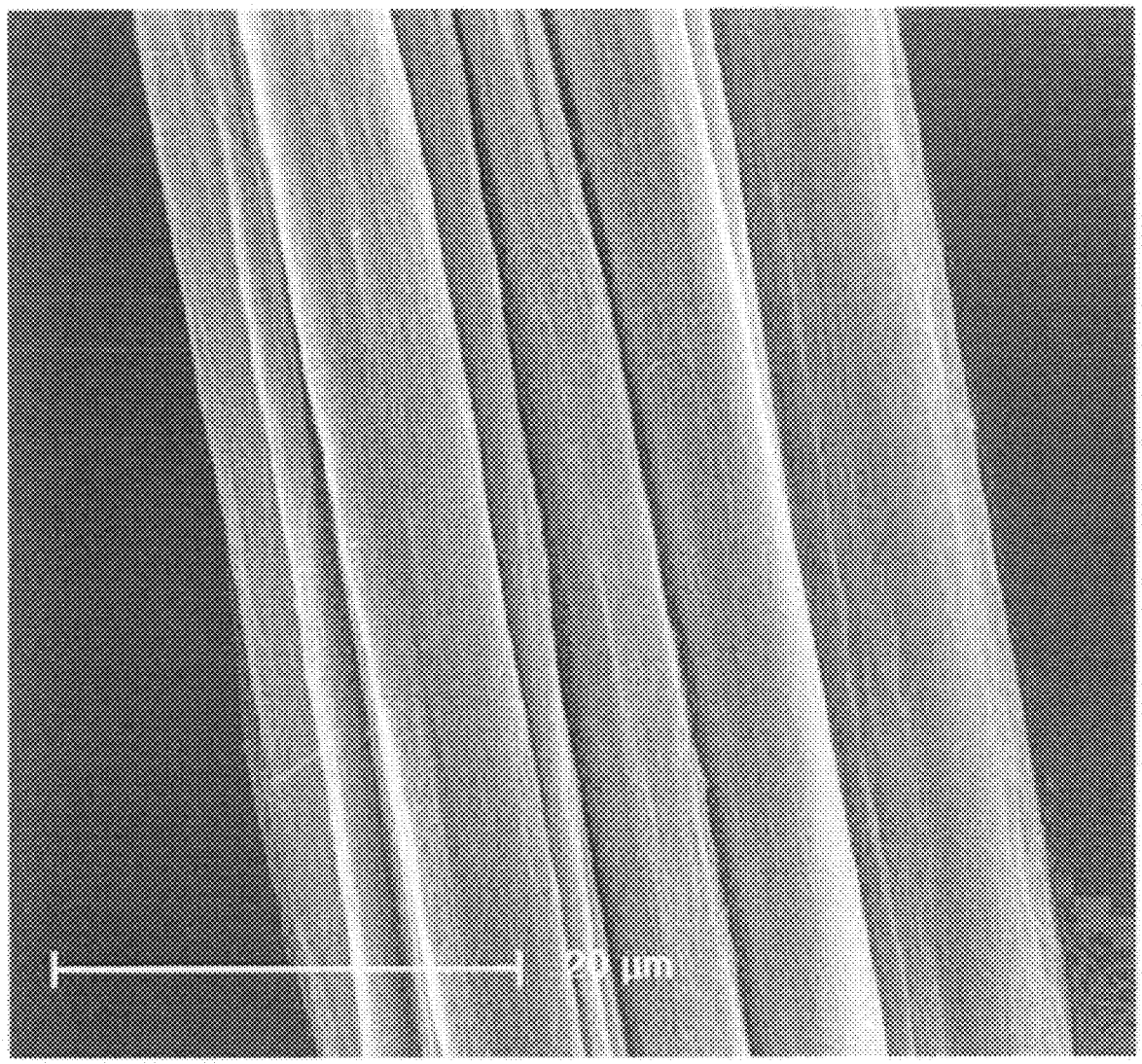
Figure 4:
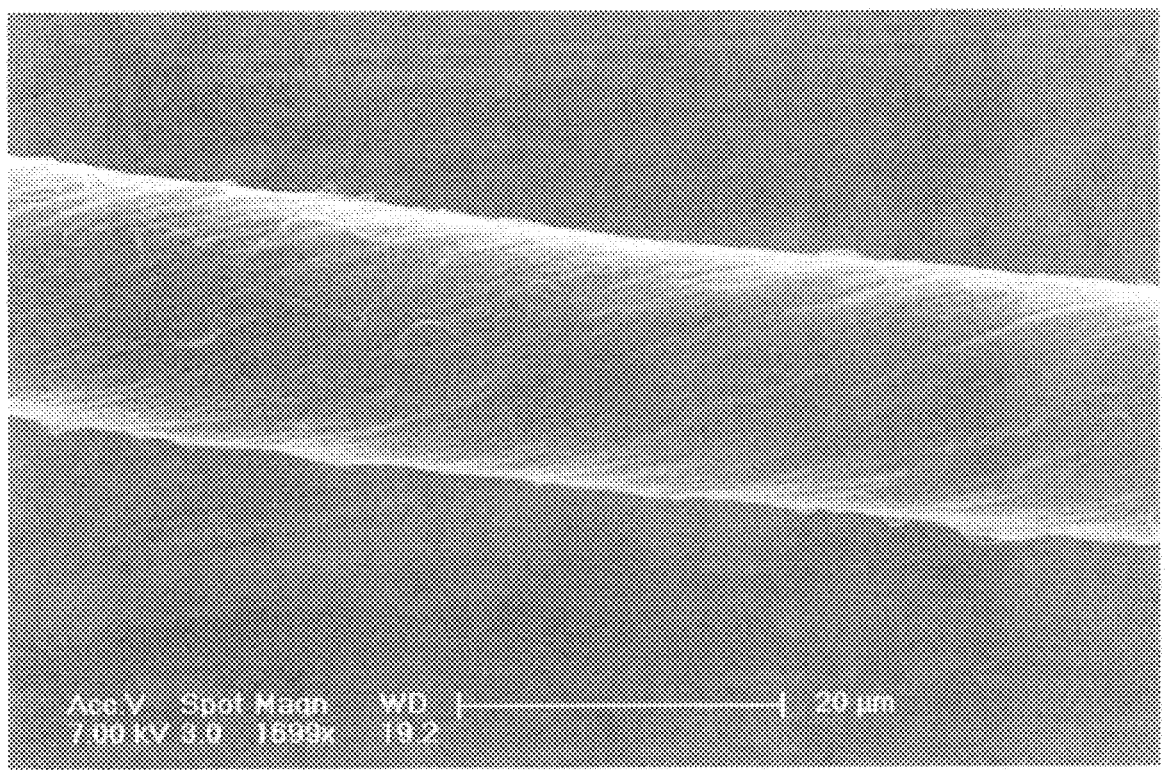

The carbon nanotube wire includes a plurality of successive and oriented carbon nanotubes. The carbon nanotubes in the carbon nanotube wire are joined end to end by van der Waals attractive force. The carbon nanotube wire 30 can also be twisted or untwisted. Referring to FIG. 3, the untwisted carbon nanotube wire includes a plurality of carbon nanotubes oriented along a same direction (e.g., a direction along the length (axis) of the wire). Referring to FIG. 4, the twisted carbon nanotube wire includes a plurality of carbon nanotubes oriented around an axial direction of the carbon nanotube wire. More specifically, the carbon nanotube wire includes a plurality of successive carbon nanotubes joined end to end by van der Waals attractive force therebetween. Length of the carbon nanotube wire can be set as desired. A diameter of the carbon nanotube wire is in an approximate range from about 0.5 nm to about 1000 μm.

The carbon nanotube cable includes two or more carbon nanotube wires. The carbon nanotube wires in the carbon nanotube cable can be parallel with each other or twisted with each other. When the carbon nanotube cable can be twisted or untwisted. In an untwisted carbon nanotube cable, the carbon nanotube wires are parallel with each other. In a twisted carbon nanotube cable, the carbon nanotube wires are twisted with each other.

Figure 5:
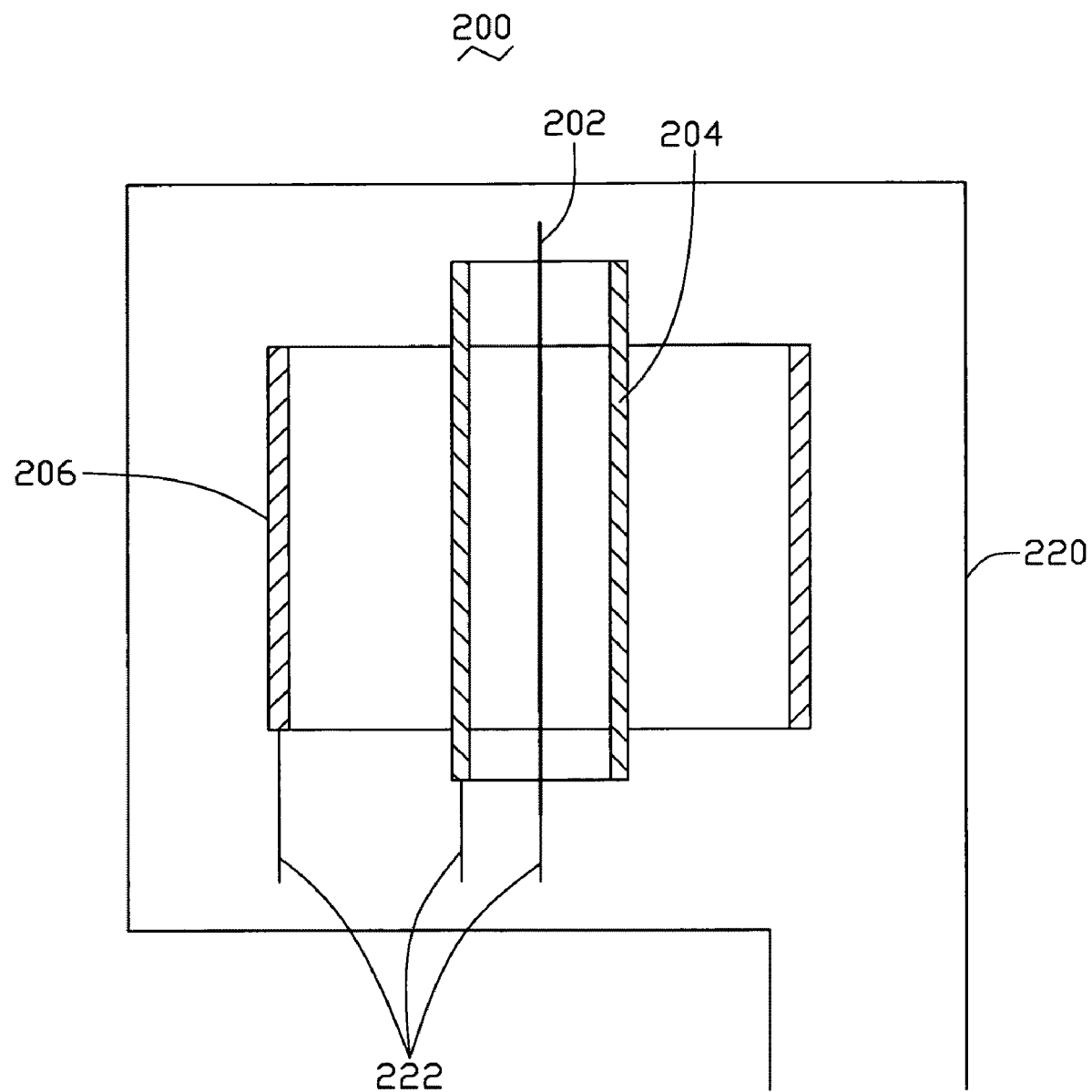

Referring to FIG. 5, an ionization vacuum gauge 200 according to a second embodiment is shown. The ionization vacuum gauge 200 includes a linear cathode 202, an anode 204, and a hollow ion collector 206 containing the linear cathode 202 and the anode 204 therein. The anode 204 can be a hollow cylinder structure which defines a hollow space. The linear cathode 202 extends through the center of the hollow space and is coaxial with the anode 204 and the ion collector 206. The linear cathode 202, the anode 204, and the ion collector 206 are spaced from one another and are not in direct electrical contact with each other. The ionization vacuum gauge 200 further includes a housing 220 and three leads 222. The difference between the vacuum gauge 200 disclosed in the second embodiment and the vacuum gauge 100 disclosed in the first embodiment is the structure of the anode 204.

Figure 6:
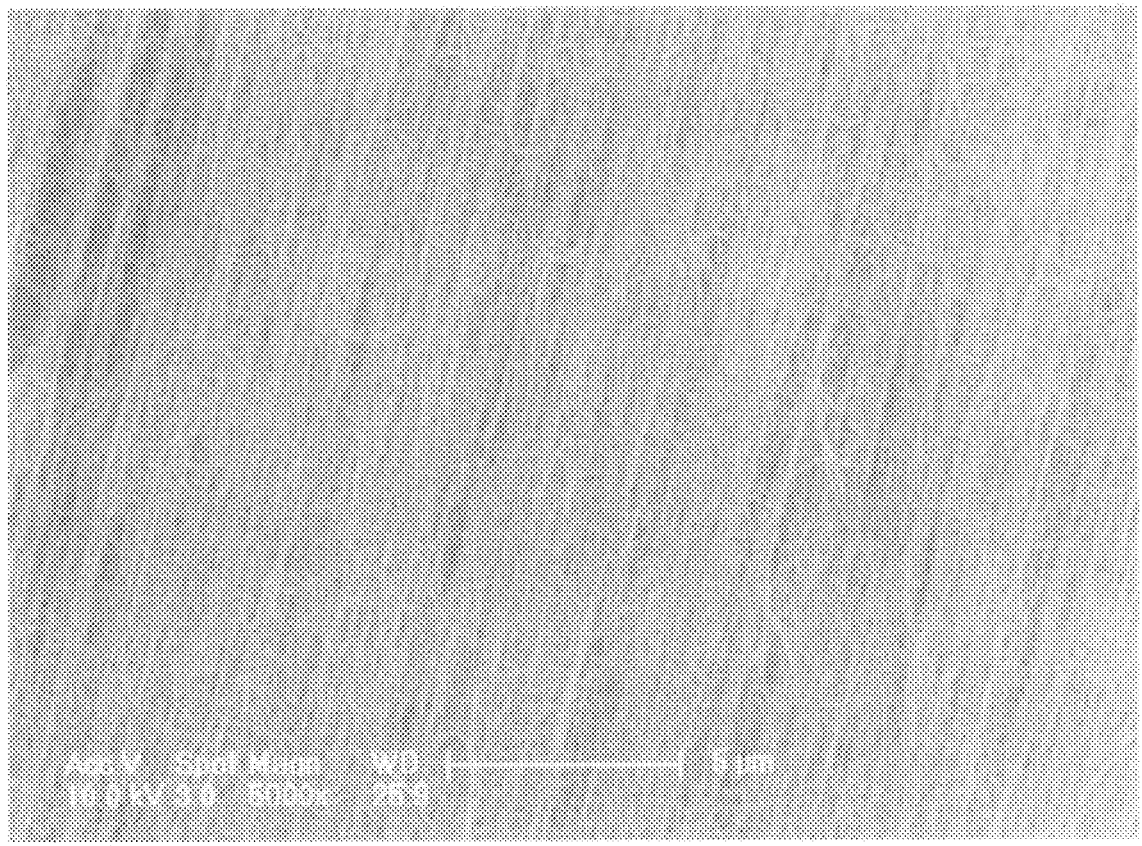
Figure 7:
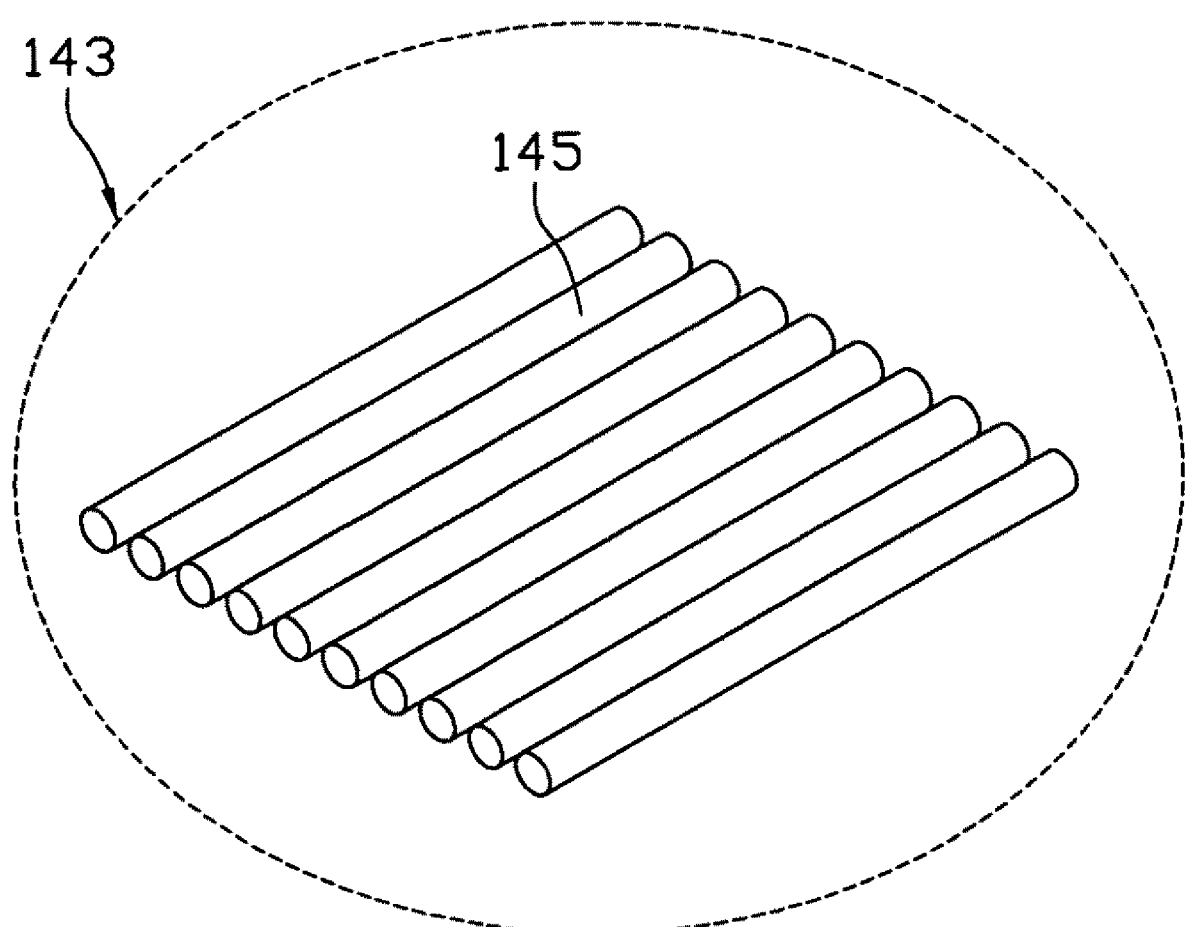

The anode 204 in the second embodiment can be a carbon nanotube structure. The carbon nanotube structure can include at least one carbon nanotube film. A plurality of micropores can be formed and distributed uniformly in the carbon nanotube structure. Diameters of the micropores range from about 1 μm to about 10 μm. The anode 204 includes one carbon nanotube film or two or more than two carbon nanotube films overlapped or stacked with each other. Each carbon nanotube film includes a plurality of carbon nanotubes arranged along a same direction (e.g., collinear and/or parallel). The carbon nanotubes in the carbon nanotube film are joined by van der Waals attractive force therebetween. Referring to FIGS. 6 and 7, the carbon nanotube film includes a plurality of successively oriented carbon nanotube segments 143 joined end-to-end by van der Waals attractive force therebetween. Each carbon nanotube segment 143 includes a plurality of carbon nanotubes in parallel, and combined by van der Waals attractive force therebetween. The carbon nanotube segments 143 can vary in width, thickness, uniformity and shape. The carbon nanotubes in the carbon nanotube segment 143 are also oriented along a predetermined orientation. When the anode 204 includes two or more carbon nanotube films, the carbon nanotube films may form a carbon nanotube layer, and the carbon nanotubes in different carbon nanotube films can be aligned along a same direction, or aligned along a different direction. An angle α between the alignment directions of the carbon nanotubes in each two adjacent carbon nanotube films is in the range $0 \leq \alpha \leq 90°$. A thickness of the carbon nanotube film is in a range from about 1 nm to about 10 μm.

When the anode 204 is cylinder, the ionization vacuum gauge 200 can further include a supporter (not shown). The supporter is configured to support the anode 204. The material of the supporter can be selected from the materials that have a low atomic number, such as beryllium (Be), boron (B) or carbon (C). The supporter may be a yarn or net, surrounding the linear cathode 202. The supporter is coaxial with the anode 204, and the anode 204 is disposed on a surface of the supporter.

The carbon nanotubes in the carbon nanotube structure can be selected from a group consisting of single-walled, double-walled, and/or multi-walled carbon nanotubes.

In operation of the ionization vacuum gauge, an electric voltage is applied between the cathode and the anode, the cathode emits electrons. The electrons are drawn and accelerated towards the anode by the electric field force, then tend to pass through the anode because of the inertia of the electrons thereof. The ion collector is supplied with a negative electric potential for decelerating the electrons. Therefore, before arriving at the ion collector, electrons are drawn back to the anode, and an electric current ($I_{electron}$) is formed. In the travel of the electrons, electrons collide with gas molecules, and ionize some of gas molecules, and thus ions are produced in this process. Typically, the ions are in the form of positive ions and are collected by the ion collector, and, thus, an ion current ($I_{ion}$) is formed. A ratio of $I_{ion}$ to $I_{electron}$ is proportional to the pressure in the ionization vacuum gauge, within a certain pressure range, covering the primary range of interest for most vacuum devices. Therefore, the pressure in the ionization vacuum gauge and, by extension, the vacuum device (not shown), to which it is fluidly attached, can be measured according to the above.

In the process discussed above, some electrons may collide with the anode, which causes the anode to emit X rays. A virtual current $I_x$ may be produced when the X rays irradiates the ion collector. The virtual current $I_x$ will affect the sensitivity of the Ionization vacuum gauge. The value of $I_x$ is related to the atomic number of the anode material. The higher the atomic number is, the greater the value of $I_x$. Since the anode material of the ionization vacuum gauge comprises carbon nanotube, the atomic number is much smaller than the conventional anode material, therefore the ionization vacuum gauge is suitable for measuring high vacuum systems.

Figure 8:
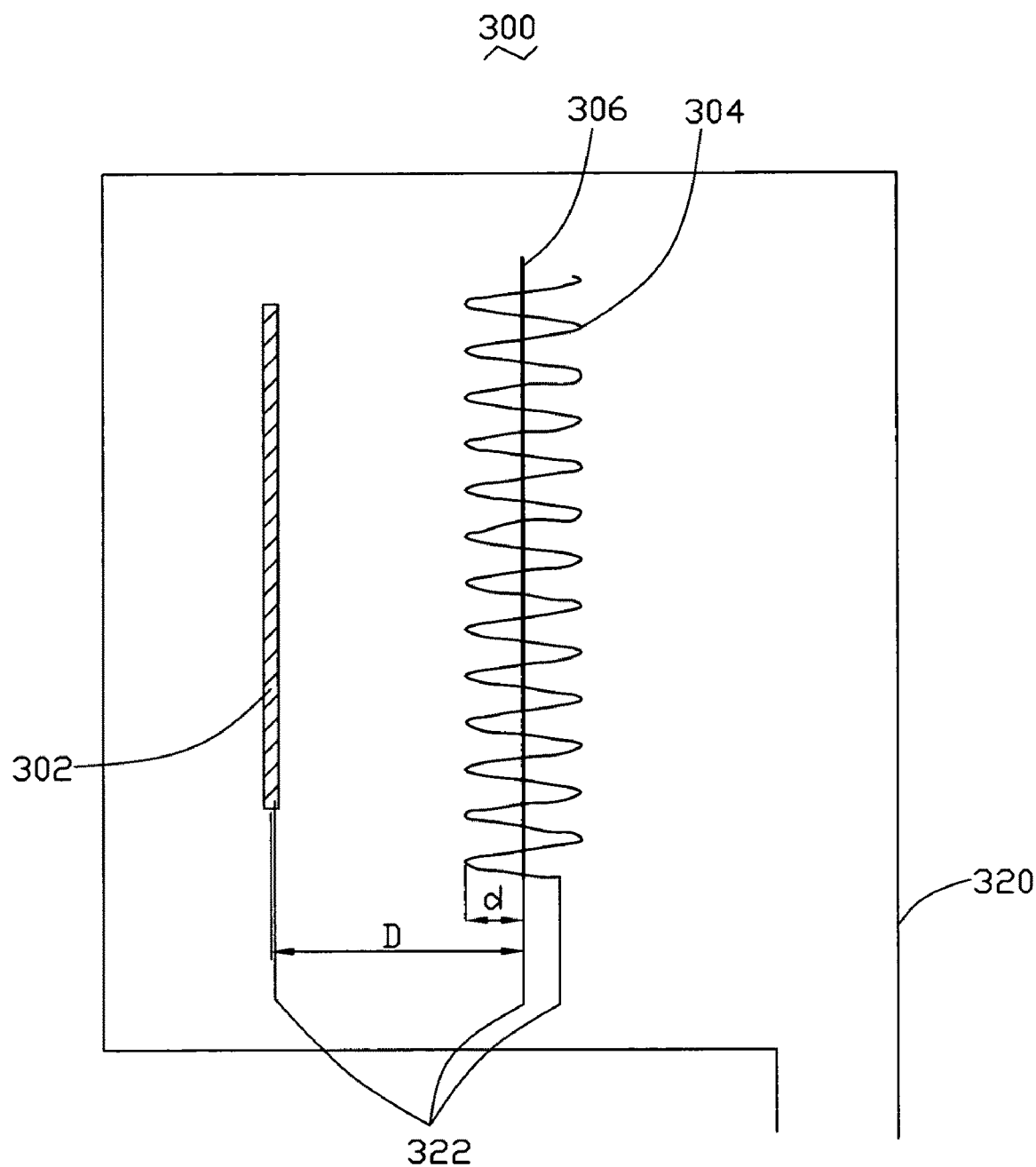

Referring to FIG. 8, an ionization vacuum gauge 300 according to a third embodiment is shown. The ionization vacuum gauge 300 includes a housing 320, a linear ion collector 306, a hollow anode 304 and a linear cathode 302. The ion collector 306, the anode 304 and the cathode 302 are contained in the housing 320. The ion collector 306 and the anode 304 are coaxial. The ionization vacuum gauge 300 further includes three leads 322. The three leads 322 are electrically connected to the linear cathode 302, the helix anode 304, and the ion collector 306, respectively. The difference between the vacuum gauge 300 disclosed in the third embodiment and the vacuum gauge 100 disclosed in the first embodiment is the position of the ion collector and the cathode and the shape of the ion collector.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An ionization vacuum gauge, comprising:
    a cathode;
    an anode surrounding the cathode, the anode is a carbon nanotube wire structure consisting of a plurality of carbon nanotubes; and
    a hollow ion collector surrounding the anode.

2. The ionization vacuum gauge as claimed in claim 1, wherein the plurality of carbon nanotubes of the carbon nanotube wire structure forms a carbon nanotube wire or forms a carbon nanotube cable consisting of two or more carbon nanotube wires.

3. The ionization vacuum gauge as claimed in claim 2, wherein the plurality of carbon nanotubes of the carbon nanotube wire is oriented along a primary direction and joined end to end by van der Waals attractive force.

4. The ionization vacuum gauge as claimed in claim 3, wherein the carbon nanotube wire is untwisted, the plurality of carbon nanotubes are parallel with each other.

5. The ionization vacuum gauge as claimed in claim 3, wherein the carbon nanotube wire is twisted, the plurality of carbon nanotubes are oriented around an axial direction of the carbon nanotube wire.

6. The ionization vacuum gauge as claimed in claim 1, wherein the cathode is a hot cathode or a cold cathode.

7. The ionization vacuum gauge as claimed in claim 1, wherein the cathode comprises a base and a field emission film coated thereon.

8. The ionization vacuum gauge as claimed in claim 7, wherein the base comprises an electric conductive thread, and a diameter of the base is in a range from about 0.2 millimeters to about 2 millimeters.

9. The ionization vacuum gauge as claimed in claim 7, wherein the field emission film comprises carbon nanotubes, glass and conductive particles.

10. The ionization vacuum gauge as claimed in claim 1, wherein a space between the cathode and the ion collector is in a range from about 10 millimeters to about 15 millimeters.

11. The ionization vacuum gauge as claimed in claim 1, wherein a space between the cathode and the anode is in a range from about 1 millimeter to about 8 millimeters.

12. An ionization vacuum gauge, comprising:
    a cathode;
    an anode surrounding the cathode, the anode is a carbon nanotube structure consisting of a plurality of carbon nanotubes; and
    a hollow ion collector surrounding the anode.

* * * * *